United States Patent

Granning

[15] 3,689,102
[45] Sept. 5, 1972

[54] VEHICLE SUSPENSION
[72] Inventor: Ole Granning, Detroit, Mich.
[73] Assignee: Granning Suspensions, Inc., Dearborn, Mich.
[22] Filed: June 12, 1970
[21] Appl. No.: 45,613

[52] U.S. Cl............280/112 R, 280/124 R, 267/63 R
[51] Int. Cl...............................................B60g 9/02
[58] Field of Search.....280/112, 112.1, 224; 267/63, 267/65

[56] References Cited

UNITED STATES PATENTS

| | | | |
|---|---|---|---|
| 2,742,302 | 4/1956 | Pointer | 280/124 F |
| 3,133,745 | 5/1964 | Granning | 280/112 R |
| 3,481,623 | 12/1969 | Campbell | 267/63 R |

*Primary Examiner*—Philip Goodman
*Attorney*—Whittemore, Hulbert & Belknap

[57] ABSTRACT

The vehicle suspension provides an axle assembly which may be mounted either on a truck-tractor or a truck-trailer to provide an additional axle. The suspension includes an axle which is suspended from the vehicle frame by means of a pair of elastomeric springs. A drawbar extends forwardly from the axle. The drawbar is connected, at its forward end, to structure depending from the vehicle frame. The connection includes resilient fastening means which permit some pivoting of the forward end of the drawbar about an axis transverse to the longitudinal axis of the drawbar and generally parallel to the axis of the axle. Lifting means are provided to raise the axle and associated wheels off the ground when desired.

6 Claims, 8 Drawing Figures

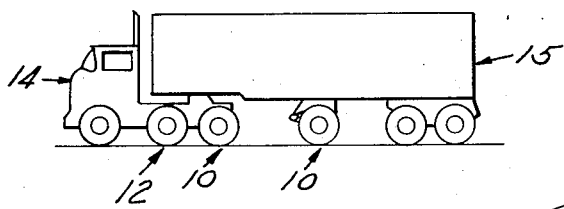
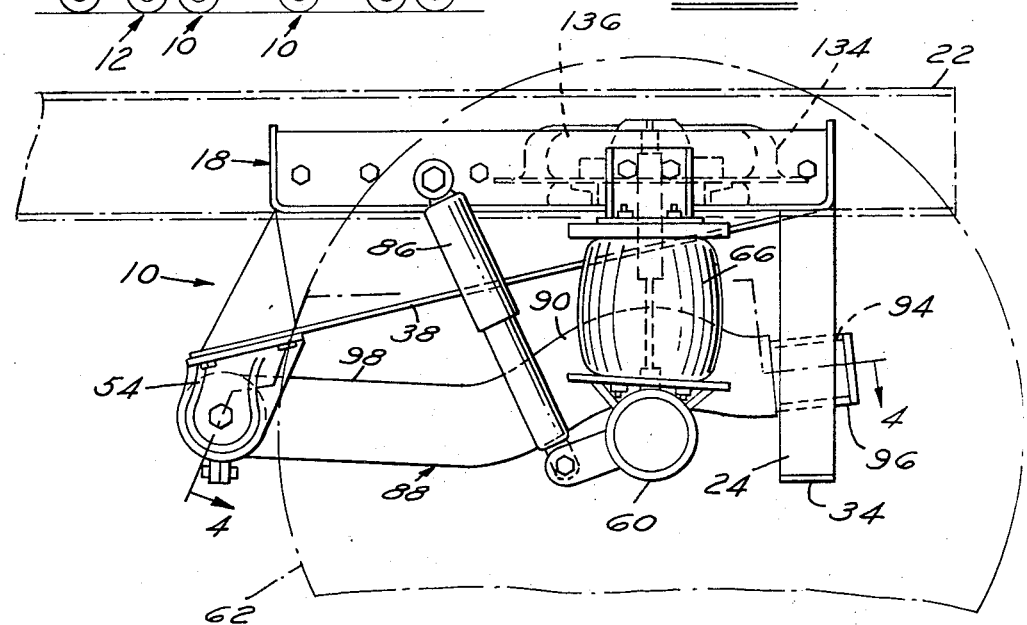
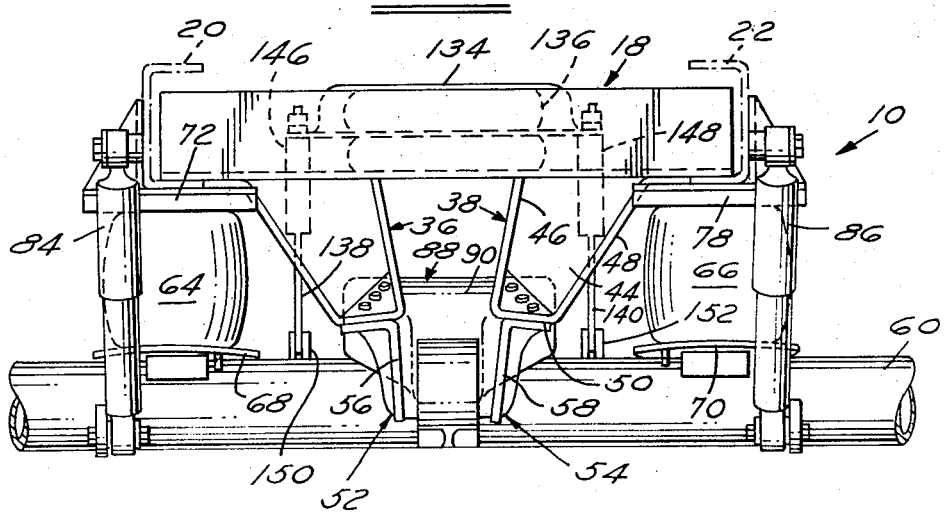

PATENTED SEP 5 1972

INVENTOR
OLE GRANNING
BY
ATTORNEYS

VEHICLE SUSPENSION

BACKGROUND OF THE INVENTION

In my United States Pat. No. 3,133,745, issued May 19, 1964, I have disclosed a tandem suspension for tractors and trailers. The present invention constitutes an improvement over my prior structure.

It is frequently desirable to add an additional axle assembly to a truck-tractor or trailer to increase the load carrying capacity of the vehicle. The maximum permissible load for each wheel of the truck is regulated by State Law. If additional wheels are provided on the truck, the permissible truck load is increased thus permitting the trucker to haul a larger payload. In addition to complying with loading regulations, it is also desirable to add an extra axle when the load is to be increased in order to prevent undue wear on the vehicle.

My present invention provides an axle assembly which may be mounted on a truck to provide the desired additional axle. A drawbar extends forwardly from the axle. I have provided a resilient fastening means for connecting the forward end of the drawbar to the vehicle frame which permits the forward end of the drawbar to pivot somewhat about an axis which is transverse to the longitudinal axis of the drawbar and generally parallel to the axle axis. This arrangement prevents hunting or seeking of the axle under certain conditions. For example, when the axle is in a lowered position as a result of a wheel being located in a depression on the roadway, the resilient fastening means would be pivoted and will urge the axle back to a level position. In prior constructions, the resilient connection would tend to strongly urge the axle back to its level position even when it should remain downwardly. For example, when the brakes are applied in prior devices, the axle would tend to pop up when it should not. The present connection minimizes this tendency.

Additionally, I have provided elastomeric springs for the suspension as opposed to pneumatic or metallic springs as have been used in the past. Other features of the invention include a novel lifting arrangement to lift the axle off the ground where there is no load on the vehicle thus saving tire wear and engine fuel. I have further provided a suspension system in one embodiment which may be used as a trailing axle located behind a driven vehicle axle and in another embodiment an axle which may be used as a pusher type axle located forwardly of a driven axle. The pusher type axle incorporates certain novel features in connection with the drawbar assembly and guide means therefor and in the axle configuration.

SUMMARY OF THE INVENTION

The suspension for a vehicle comprises a suspension support structure which is separate from the vehicle frame. The suspension support structure is of a size and includes structure for mounting thereof on the vehicle frame. A spring structure is securable between the vehicle frame and an axle. The axle is suspended from the spring structure. A drawbar extends outwardly from the axle towards the forward end of the suspension support structure. A depending support structure is provided at the forward end of the suspension. Resilient fastening means pivotable about an axis transverse to the longitudinal axis of the drawbar and generally parallel to the axis of the axle secure the drawbar to the depending support structure. Vertical guide means comprising downwardly depending means defining guide surface structure for securement to the vehicle frame are provided. Vertically slidable structure is secured to the axle for sliding engagement with the guide surface structure.

IN THE DRAWINGS:

FIG. 1 is a side elevational view of a tractor-trailer combination on which vehicle suspensions in accordance with the embodiments of the present invention are mounted;

FIG. 2 is a side elevational view of a trailing type vehicle suspension in accordance with one embodiment of the present invention;

FIG. 3 is a front elevational view of the vehicle suspension of FIG. 2;

Figure 4:
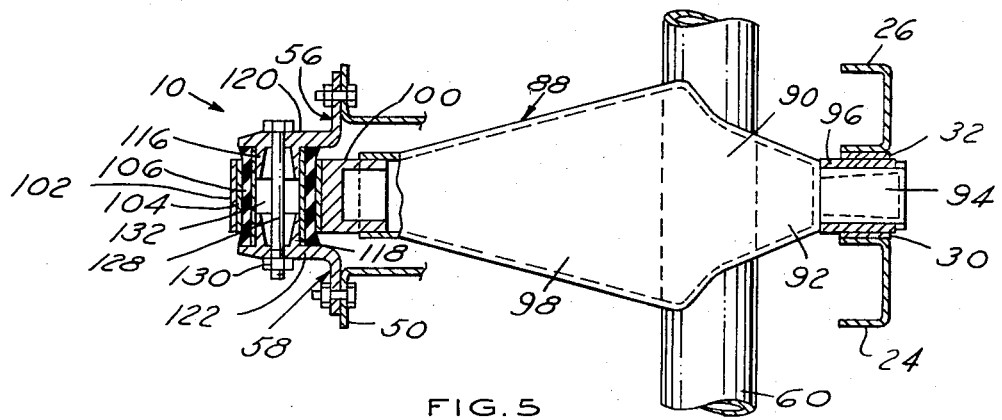
FIG. 4 is a top plan view of the vehicle suspension of FIG. 2 illustrating the drawbar assembly which is partly in section for the purpose of clarity taken substantially along the line 4—4 of FIG. 2 looking in the direction of the arrows.
Figure 5:
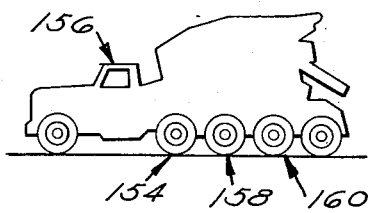
FIG. 5 is an elevational view of a truck illustratively having mounted thereon a pusher type axle vehicle suspension in accordance with another embodiment of the present invention.
Figure 6:
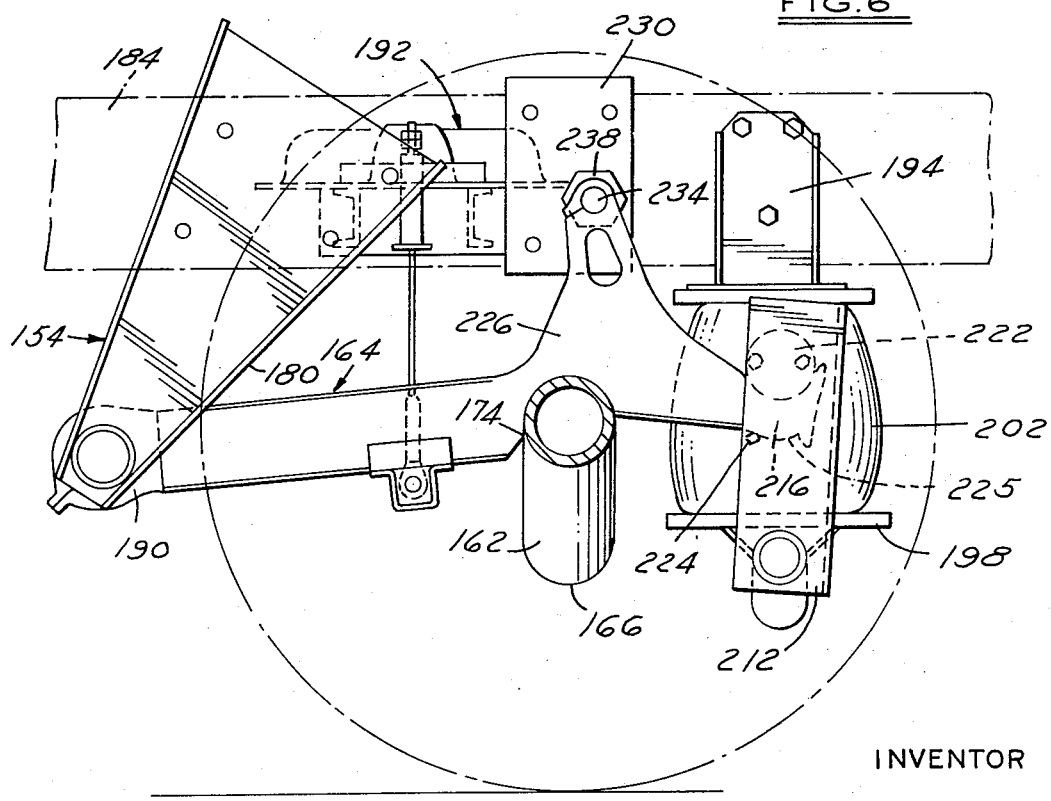
FIG. 6 is a side elevational view of the vehicle suspension of FIG. 5.
Figure 7:
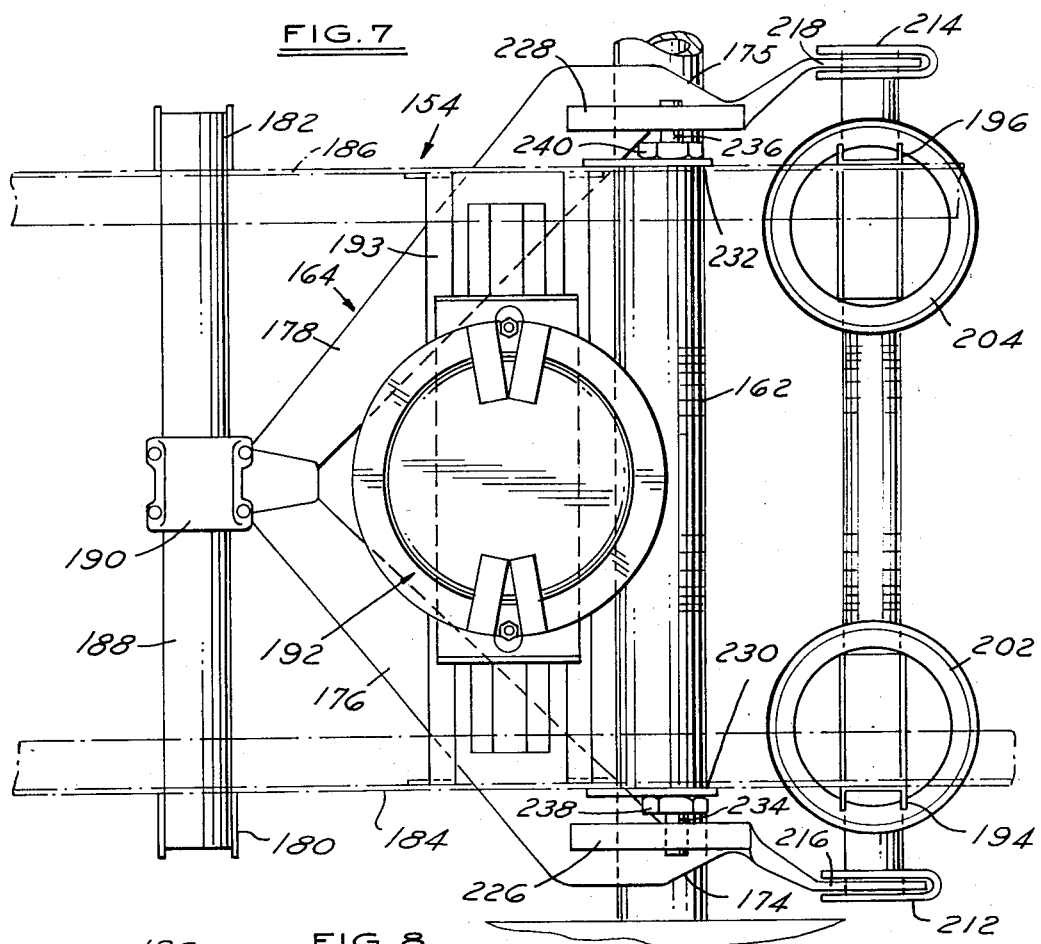
FIG. 7 is a plan view of the vehicle suspension of FIG. 6.
Figure 8:
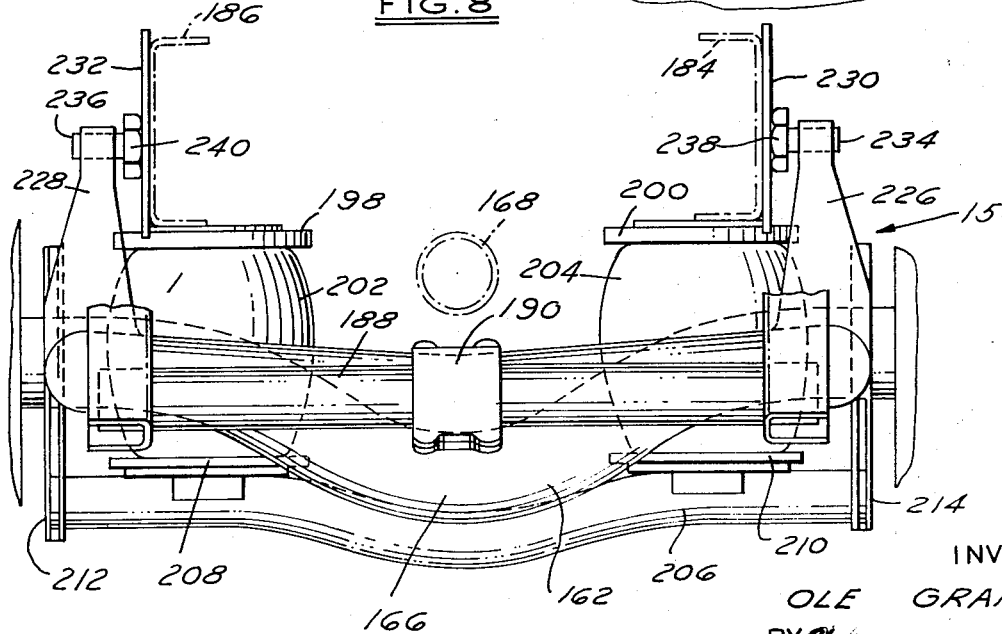
FIG. 8 is a front elevational view of the vehicle suspension of FIG. 6.

The trailing type axle vehicle suspension 10 illustrated in FIGS. 2-4 is adapted, as illustrated in FIG. 1, for mounting behind the driven axle 12 of a tractor 14 or on the trailer 15 which is pulled by the tractor. For this reason, the suspension 10 is designated as a trailing type.

Referring more specifically to the structure illustrated in FIGS. 2-4, it will be noted that the vehicle suspension 10 includes suspension support structure comprising a generally rectangular support structure 18 which is separate from the vehicle frame and 18 which is adapted for mounting on a pair of spaced apart vehicle frame channel members 20, 22, shown in dotted lines. A pair of channel legs 24, 26 extend downwardly from the rear of the structure 18. The legs are spaced apart to form a guide opening. Bearing plates 30, 32 are provided on the inner faces of the legs 24, 26. The legs are joined together at their lower ends by a plate 34. A pair of longitudinally extending, spaced apart support members 36, 38 are provided on the underside of the structure 18 and extend from the forward portion to the rearward portion. As will be noted, these members 36, 38 extend downwardly at the forward end of the structure 18 and are angled upwardly towards the rearward end forming a generally triangular shaped configuration as viewed from the side as in FIG. 2. The forward end portions of the members 36, 38 are enlarged, each comprising a back wall 44, side walls 46, 48, and bottom wall 50. Angle structures 52, 54 are bolted to the underside of the bottom walls. The angle structures include downwardly depending coupling elements 56, 58.

An axle 60, which supports a pair of rotatable wheels 62, indicated in dotted lines, is supported and guided between the front and rear leg structures of the structure 18 and is suspended from the truck frame by a pair of elastomeric springs 64, 66. As will be noted, the springs 64, 66 are generally oval in cross-section in the unloaded condition as illustrated in the Figures. When a load is applied, the springs deform laterally into a somewhat doughnut shape under full load conditions. These springs are desirable from the cost standpoint and result in long maintenance-free life. Auxiliary shock absorbers may be eliminated although such are used in the present embodiment. The springs result in built-in damping. The springs are fabricated from a rubber-like elastomeric material.

The springs 64, 66 are provided with metallic plates bedded into each end thereof. A lower spring support plate 68, 70 is secured to the axle 60, as by welding, in alignment with the springs. Upper plates 72, 78 are secured to the axle frame 18 by means of bolts. The springs 64, 66 are bolted at the upper and lower ends thereof to the respective plates. The axle frame 18, in turn, is bolted to the truck frame members 20, 22. A pair of shock absorbers 84, 86 extend between the truck frame and axle 60. However, as previously noted, the shock absorbers may be eliminated in certain instances because the springs 64, 66 also function as shock absorbers.

A combination drawbar and guide spindle member 88 is secured to the axle 60 as by welding. The member 88 is a unitized structure, having a central curved portion 90 which extends over the axle 60 and has a recess in the lower surface thereof which is received on the axle and welded thereto. The member 88 extends longitudinally between the forward leg structures 56, 58 and the rearward guide leg structures 24, 26. As will be noted in FIG. 4, both rearwardly and forwardly extending portions of the member 88, viewed in plan, are triangularly shaped thus resulting in high strength characteristics.

The rearward portion 92 functions as a guide spindle. The spindle portion 92 has a cylindrical outer end 94 of reduced diameter. The end 94 rotatably extends into a rectangular guide block 96 which is mounted for vertical sliding travel in the opening between the legs 24, 26. The spindle portion 92 permits vertical movement of the axle under the constraint of the springs 64, 66 and also permits tilting of the axle about a horizontal axis defined by the longitudinal axis of the spindle portion. The spindle portion maintains the axle in alignment by preventing lateral movement of the axle or pivoting of the axle about a vertical axis.

A drawbar portion 98 extends forwardly from the axle and couples the axle to the truck frame. The drawbar portion includes a coupling element 100 which is secured to the forward end as by welding. The element 100 extends forwardly and terminates in a cylindrical element 102. The longitudinal axis of the element 102 extends transversely of the longitudinal axis of the drawbar portion and generally parallel to the longitudinal axis of the axle 60. A bushing 104 is press-fitted into the element 102. A resilient sleeve 106 is received within the bushing 104.

The coupling elements 56, 58 are secured to the coupling element 100. The elements 56, 58 each have an inwardly extending cylindrical portion 116, 118 which is received in the sleeve 106. Longitudinally extending recesses are provided in the portions 116, 118. The recesses taper radially inwardly. A clamping wall 120, 122 is provided on each of the elements 56, 58 to bear against the outer ends of the resilient sleeve 106. A bolt 128 extends through the portions 116, 118. A nut 130 is provided on the threaded end of the bolt. The bolt extends through a guide element 132 provided within the sleeve 106 and against which the portions 116, 118 abut. The bolt is tightened a degree to cause pressure engagement of the resilient sleeve 106 with the bushing 104 and the outer surface of the coupling portions 116, 118. The pressure applied is sufficient, for example, three hundred foot-pounds, to cause frictional engagement of the various members and prevent relative rotation thereof.

In operation, the resilient sleeve 106 permits the outer end of drawbar portion 98 to pivot about a transverse axis a slight degree upon a rise or fall of the axle. The sleeve 106 also permits a slight amount of tilting about the longitudinal axis, thus accommodating axle pivoting about a horizontal axis defined by the drawbar and spindle portions. Whenever the axle is moved out of its normal position, the sleeve 106 urges it back towards the normal position and will reposition the axle upon cessation of the force thereon. However, the sleeve 106 does not result in the device tending to strongly seek a center position as has been the case with previous drawbar devices wherein a resilient connection having a center of rotation about an axis parallel to the drawbar axis has been utilized. Such a resilient connection has tended to cause centering of the axle when it is undesired as, for example, when the brakes are applied and a wheel is located in a depression in the roadway. At that time, it is not desired that the axle be centered. However, the previous type of resilient connection has tended to cause such centering when the brakes were applied.

A lifting structure is provided to lift the axle 60 upwardly to move the wheels off the road when the vehicle is not loaded. It is desirable to lift the axle upwardly to disengage the wheels from the surface of the roadway at such times in order to reduce drag caused by engagement of the wheels and wear on the tires. The lifting structure comprises a cup-shapted member 134 positioned above the axle 60. A pneumatic bellows 136 is provided within the member 134. The upper portion of the bellows 136 bears against the member 134 while the lower portion of the bellows is supported by the frame 18. A cable 138, 140 is attached to diametrically opposite edge portions of the member 134. The cables extend through guide structures 146, 148 and are attached at the lower ends to brackets 150, 152 secured to the axle 60. When it is desired to raise the axle 60, air under pressure is injected into the bellows 136 causing the bellows to expand and lift the member 134 upwardly. The cables 138, 140 then raise the axle 60 against the action of the springs 64, 66 causing the axle to be raised a sufficient distance to raise the wheels off the ground. The bellows 136 is exhausted when it is desired to lower the axle.

Referring now to the embodiment illustrated in FIGS. 5-8, the pusher type axle suspension arrangement 154 is adapted for mounting on a truck 156 forward of the tandem drive axles 158, 160 illustrated. The basic principles of the suspension assembly 154 are the same as those previously described in connection with the suspension assembly 12. A unitary frame, such as the frame 18, is not provided. However, various structure is provided which together constitutes a frame. The axle 162 is supported at its center by means of a longitudinally extending drawbar-guide structure 164. The center portion 166 of the axle is curved downwardly to provide room thereabove for extension thereover of the drive shaft 168 (indicated in dotted lines) which must, of course, be accommodated to permit transmission of power from the engine over the axle 162 into connection with the driven axles 158, 160.

The drawbar portion of the structure 164 is welded at 174, 175 to the axle. As will be noted in FIG. 7, the drawbar portion includes inwardly converging legs 176, 178 which extend the points of attachment adjacent the outer ends of the axle into connection with each other at a point centrally located with respect to the axle to thus define a V-shaped configuration when viewed in plan. A pair of forwardly and downwardly V-shaped legs 180, 182 are bolted to the truck frame members 184, 186 (indicated in dotted lines). A cylindrical support member 188 extends between the lower ends of the legs 180, 182. A coupling 190 extends from the juncture of the legs 176, 178 into engagement with the cylindrical member 188 centrally thereof. The coupling 190 is a resilient coupling of the type described in connection with the FIG. 1 embodiment. A lifting structure 192 of the type previously described is provided between the truck frame and on a support platform 193 to permit pneumatic lifting of the axle assembly when it is desired to lift the wheels off the ground.

A pair of brackets 194, 196 are bolted to the truck frame rearwardly of the axle 162. The brackets 194, 196 have generally horizontally extending plates 198, 200 secured thereto. A resilient spring 202, 204 of the type previously described is connected at the upper end to the underside of the plates 198, 200. A transversely extending cylindrical support element 206, also having a downwardly curved center portion, extends between and beyond the springs 202, 204. A flat horizontal plate 208, 210 is secured to the element 206, as by welding, beneath each of the springs. The lower portion of the springs is bolted to the plates 208, 210. An upwardly extending anchor element 212, 214 is provided at each outer end of the transverse element 206. The anchor elements 212, 214 are U-shaped and receive the rearwardly extending portion 216, 218 of the drawbar legs 176, 178. As will be noted in FIG. 6, a cylindrical locater element 222 is provided above each of the drawbar elements and is received in a curved recess. The element 222 is bolted in place. Another bolt 224 is provided beneath the end of the drawbar to thereby hold the drawbar securely in place. The lower surface 225 of the portions 216, 218 are curved to thereby permit limited pivoting. As will be appreciated, the structure described connects the drawbar to the springs 202, 204 and the springs to the truck frame to thereby provide a resilient suspension for the entire assembly.

A guide portion 226, 228 extends upwardly from the drawbar legs 176, 178. A wear plate 230, 232 is bolted to the sides of the truck frame element in general alignment with the upper end of each of the portions 226, 228. A threaded opening is provided in the upper end of each of the portions 226, 228 to receive the threaded shank 234, 236 of a wear bolt having an enlarged head 238, 240. The wear bolts are in sliding contact with the plates 230, 232 and describe an arc, upon upward and downward movement of the axle 162, which extends from the lower right hand corner of the wear plates, as viewed in FIG. 6, towards the upper left hand corner. Both the wear plates and the wear bolts are fabricated of hardened metal for long life. This structure serves to guide the axle suspension in its up and down movement during use. As either the wear plate or wear bolt is eroded as a result of the sliding contact, the wear bolt may be adjusted inwardly by threading the shanks towards the wear plate. Adjustment may also be made to accommodate differences in vehicle frame size.

WHAT I CLAIM AS MY INVENTION IS:

1. In a suspension for a vehicle having a frame comprising a suspension support structure separate from the vehicle frame, said suspension support structure being of a size and including structure for mounting thereof on the vehicle frame, an axle, a spring structure securable between the vehicle frame and axle, said axle suspended from said spring structure, a drawbar extending outwardly from the axle towards the forward end of said suspension support structure, a depending axle support structure at the forward end of the suspension, resilient fastening means pivotable about an axis transverse to the longitudinal axis of the drawbar and generally parallel to the axis of the axle securing the drawbar to the depending axle support structure, said resilient fastening means including an outer metallic sleeve coupling member on the drawbar having a longitudinal axis as described, a resilient elastomeric sleeve within said metallic sleeve, and a coupling member extending through said elastomeric sleeve and attached to the depending axle support structure, and vertical guide means comprising downwardly depending means defining guide surface structure for securement to the vehicle frame and vertically slidable structure secured to the axle for sliding engagement with the guide surface structure.

2. A suspension as defined in claim 1, further characterized in that said spring structure comprises a pair of spaced apart resilient elastomeric spring members.

3. A suspension as defined in claim 2, and further characterized in that said spring members are substantially oval in vertical cross-section.

4. A suspension as defined in claim 1, and further characterized in that said coupling member includes means for applying pressure on the ends of the elastomeric sleeve to frictionally couple the elements together.

5. A suspension as defined in claim 1, further characterized in the provision of a pneumatic lifting assembly for said axle comprising an inflatable lift element securable to the vehicle frame, and a pair of spaced apart cables extending from said inflatable lift element into connection with axle to lift the axle upon inflation of the inflatable element.

6. A suspension as defined in claim 1, further characterized in that said vertically slidable structure secured to the axle comprises an integral extension from the drawbar extending rearwardly from the axle, said suspension support structure including a pair of downwardly depending spaced apart leg members, the adjacent surfaces of the leg members providing a vertical guide defining said guide surface structure, a guide block pivotally secured to said extension defining said vertically slidable structure for sliding engagement in said vertical guide.

* * * * *